United States Patent [19]
Nakane et al.

[11] Patent Number: 5,761,163
[45] Date of Patent: Jun. 2, 1998

[54] TRACK JUMP SERVO APPARATUS FOR DISC REPRODUCING SYSTEM

[75] Inventors: Hiroshi Nakane, Saitama-ken; Takayuki Uchida, Kanagawa-ken, both of Japan

[73] Assignee: Kabushiki Kaisha Toshiba, Kanagawa-ken, Japan

[21] Appl. No.: 533,150

[22] Filed: Sep. 25, 1995

[51] Int. Cl.$^6$ .................................................. G11B 7/00
[52] U.S. Cl. .................................... 369/44.28; 369/50
[58] Field of Search .................... 369/44.28, 44.29, 369/32, 50, 47, 48; 360/73.03, 73.02

[56] References Cited

U.S. PATENT DOCUMENTS

| | | | |
|---|---|---|---|
| 4,603,412 | 7/1986 | Yamazaki | 369/50 |
| 4,672,597 | 6/1987 | Yamazaki | 369/50 |
| 4,853,914 | 8/1989 | Okano et al. | 369/50 |
| 5,036,508 | 7/1991 | Okano | 369/50 |
| 5,535,186 | 7/1996 | Niura et al. | 369/44.28 |
| 5,642,342 | 6/1997 | Murata | 369/54 |

*Primary Examiner*—Thang V. Tran
*Attorney, Agent, or Firm*—Cushman Darby & Cushman IP Group of Pillsbury Madison & Sutro, LLP

[57] ABSTRACT

A disc reproducing system having a pickup for reading data recorded on a disc that is rotated by a disc drive motor. The system, also has a clock signal generator for generating a clock signal that is phase-locked with the data read by a pickup, and a processor for processing the data read by the pickup based on the clock signal generated by the clock signal generating means. Further included in the system is a linear velocity signal generator for generating a linear velocity signal with a frequency that is related to the rotational speed of the disc, a servo controller for controlling the rotation speed of the disc drive motor so as to keep constant a relative speed between the pickup and the disc, and a pickup feed motor for moving the pickup in the radial direction of the disc. The apparatus is characterized by the fact that a capture range of the clock signal generator can be controlled to meet the clock signal with the data read by the pickup at a completion of the pickup feed operation.

32 Claims, 4 Drawing Sheets

1

TRACK JUMP SERVO APPARATUS FOR DISC REPRODUCING SYSTEM

FIELD OF THE INVENTION

The present invention relates to a disc reproducing system, such as a CD-ROM (compact disc read only memory) drive, and more particularly, to an improved track jump control apparatus, which is used during a fast search operation.

BACKGROUND OF THE INVENTION

As is well known in the art, optical disc reproducing systems use a fast search function for searching for object data within an enormous amount of data recorded on the disc and reproducing the object data as fast as possible. The fast search function is accomplished by moving the optical pickup in the radial direction of the disc at high speed to a target track where the object data is recorded. This procedure is also known as track jumping.

In a CD-ROM system, digital data is recorded by use of a CLV (constant linear velocity) system on a disc along a track with uniform density. The system for reproducing the data on the disc attempts to keep the relative velocity between the disc and the optical pickup constant. In other words, the rotational speed of the disc is changed in response to the track position of the optical pickup. In sum, it is necessary to control the rotational speed of the disc in a CLV servo system.

In a CD-Rom drive system, for instance, when the optical pickup position changes from the inner most radius track of the disc (e.g., 0 minutes and 2.00 seconds block in address) to the outer most radius track (e.g., 60 minutes and 0.00 seconds block in address), the rotational speed of the disc is controlled from 500 rpm to 200 rpm. Thus, when the optical pickup moves from the inner most radius track to the outer most radius track of the disc, it becomes necessary to change the rotation speed of the disc by about 300 rpm.

In this kind of the optical disc reproducing system, when the fast search operation is performed, it will be impossible to read the digital data from the target track without two requirements first being satisfied. First, the optical pickup needs to move from the present track to the target track. Second, the rotational speed of the disc needs to change so as to maintain the constant relative velocity between the optical pickup and the target track. Thus, the time involved in the completion of a fast search operation is defined by the completion of this second requirement. Further, in conventional optical disc reproducing systems, it is common that the time necessary for satisfying this second requirement is much longer than the that time necessary for satisfying the first requirement (i.e., moving the optical pickup at high speed). In other words, the first requirement may be satisfied in a relatively short time period. This is so because, even if the optical pickup, which is moved in the radial direction of the disc at high speed by the pickup feed motor, is moved from the inner most radius track to the outer most radius track of the disc, its moving distance is only about 32 mm short, and because there is less burden on the pickup feed motor since the optical pickup moves from almost a standstill.

On the other hand, although the disc's rotation is caused by the disc drive motor, it will be necessary to use a disc drive motor having a large torque so as to rapidly change the rotation speed of the disc, which is already rotating at high speed, against its inertial force. However, a disc drive motor with small drive torque is used because using a motor with large torque for only the fast searching function causes a disadvantage when considering the power-saving obtained by a small drive torque motor or economical problems caused by use of a large torque motor.

Thus, even if it takes 0.1 seconds for moving the optical pickup from the present track to the target track during the fast searching operation, it takes 1 second, for example, to control the rotation speed of the disc for maintaining the constant relative velocity between the optical pickup and the disc. This means that the operation from the completion of the fast search operation to reading of the digital data in the target track takes 1 second. Thus, the same result could be obtained if it takes 1 second for moving the optical pickup.

As described above, the conventional track jump servo means used for the disc reproducing system has a drawback because the moving of the optical pickup from the present track to the target track takes much less time than controlling to rotation speed of the disc.

SUMMARY OF THE INVENTION

The object of the present invention is to remove the foregoing drawbacks of the conventional apparatus. That is, the present invention has an object to provide a track jump servo apparatus for the disc reproducing system that is able to reduce the time required for achieving the fast search operation without using a disc drive motor having a large torque.

In order to achieve the above object, a track jump servo apparatus for the disc reproducing system according to one aspect of the present invention has a pickup for reading a data recorded on a disc that is rotated by a disc drive motor; a clock signal generator for generating a clock signal that is phase-locked with the data read by the pickup, a processor for processing the data read by the pickup based on the clock signal generated by the clock signal generating means; a linear velocity signal generator for generating a linear velocity signal with a frequency that is related to the rotational speed of the disc; a servo controller for controlling the rotational speed of the disc drive motor so that a relative speed between the pickup and the disc is kept constant; and a pickup feed motor for moving the pickup in the radial direction of the disc; and wherein the apparatus is characterized by the fact that a capture range of the clock that is phase-locked with the data read by the pickup can be controlled so as to allow the data to be read by pickup at a completion of the pickup feed operation.

According to the construction as described above, since the capture range to which the clock can be synchronized is defied by phase of the data obtained from the pickup that is stopped after a movement to the target track, it is possible to reproduce the data from the disc just after the pickup has reached the target track, and it is also possible to reduce the time involved in reading the data after fast search operation without using a disc drive motor having a large torque.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes further better understood by reference to the following detailed description when considered in connection with the accompanying drawings, wherein.

DESCRIPTION OF THE PREFERRED EMBODIMENTS

The present invention will be described in detail with reference to the FIGS. 1 through 4.

Figure 1:
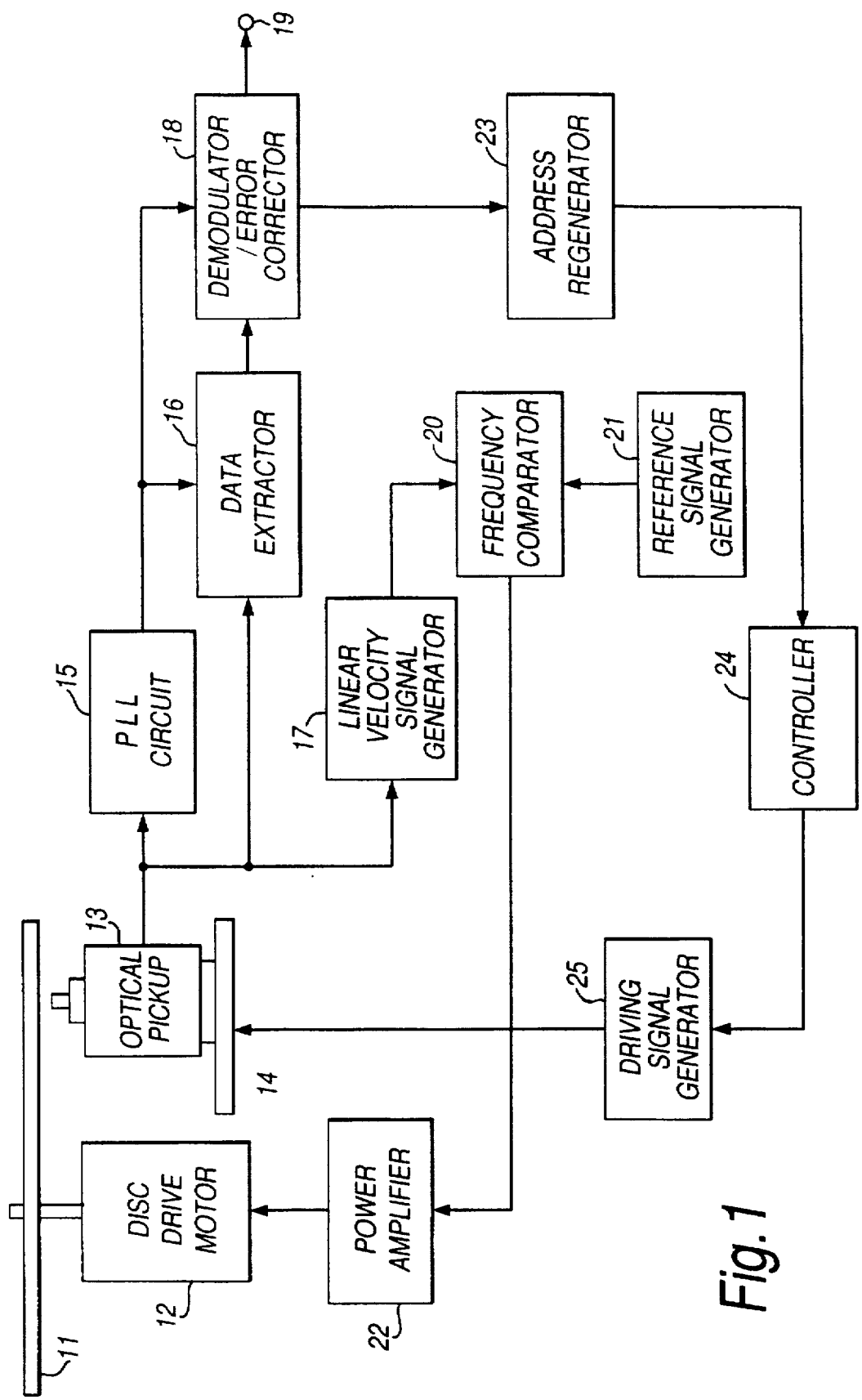
FIG. 1 is a block construction diagram showing one embodiment of the track jump servo apparatus for the disc reproducing system according to the present invention.
Figure 2:
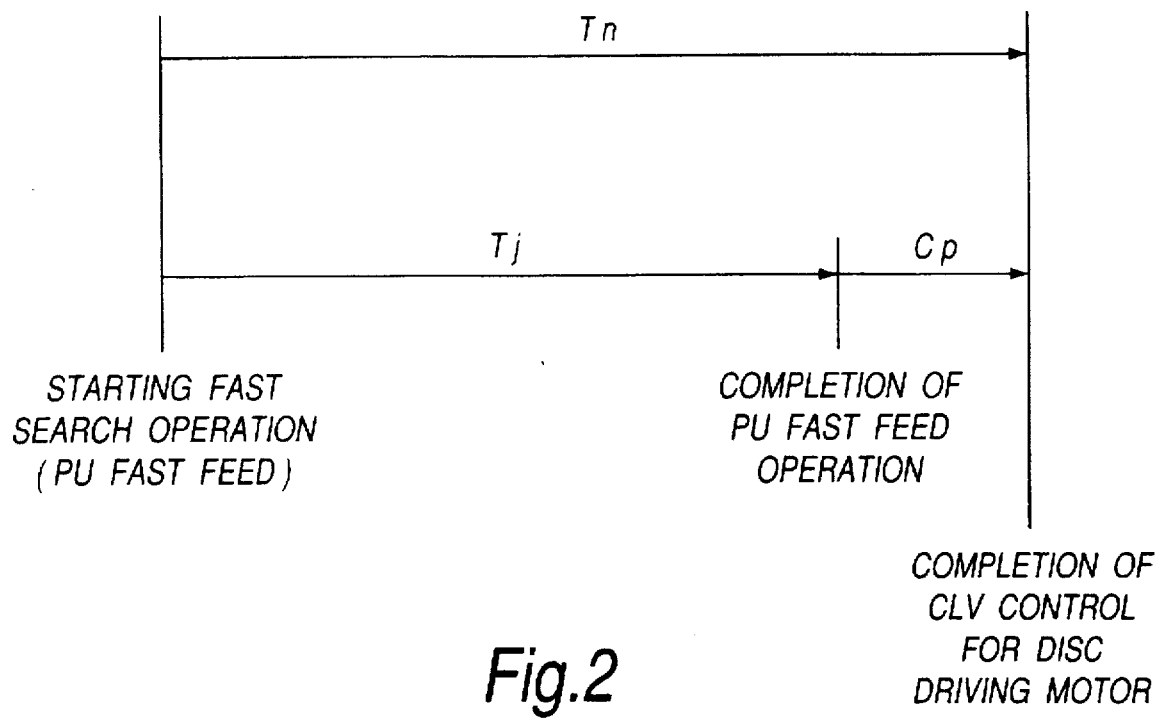
FIG. 2 is a diagram for explaining the capture range of the PLL circuit.

Referring now to FIGS. 1 and 2, a first embodiment of the track jump servo apparatus for a disc reproducing system according to the present invention will be described in detail.

In FIG. 1, numeral 11 denotes the disc, which is rotated at a prescribed rotational speed by disc drive motor 12. On the information bearing surface side of disc 11 (i.e., the lower surface in the drawing) optical pickup 13, which reads the digital data recorded on disc 11, is movably supported on rail 14, which is positioned in the radial direction of disc 11.

When data on disc 11 is reproduced normally, the digital data read by optical pickup 13 is supplied to PLL (phase-lock loop) circuit 15, data extractor 16 and linear velocity signal generator 17. PLL circuit 15 generates a bit synchronizing clock signal from the input digital data, which synchronize the phase of the digital data, and outputs the bit synchronizing clock signal to data extractor 16 and demodulator/error corrector 18.

Further, data extractor 16 extracts data from the digital data input based on the bit synchronizing clock signal output from PLL circuit 15 and outputs it to demodulator/error corrector 18. And, demodulator/error corrector 18 performs functions such as a demodulation processing or error correcting processing on the data based on the bit synchronizing clock signal output from PLL circuit 15 so as to reproduce the digital data recorded on disc 11 and output it from output terminal 19.

Further, linear velocity signal generator 17 generates a linear velocity signal having a frequency that is related to the rotation speed of disc 11 from the input digital data and outputs it to one of the input terminals of frequency comparator 20. Frequency comparator 20 compares the frequency of the linear velocity signal that is generated by linear velocity signal generator 17 and a fixed frequency generated by reference signal generator 21. Frequency comparator 20 also generates a torque control signal that is associated with the frequency difference between the linear velocity signal and the fixed frequency generated by reference signal generator 21.

The torque control signal output from frequency comparator 20 is supplied to disc drive motor 12 after being converted to a motor driving signal by power amplifier 22 so as to control the rotational speed of disc 11 to meet the frequency of the linear velocity signal with that generated by reference signal generator 21. Here, a CLV servo is operated so as to fix the value of the relative velocity between optical pickup 13 and disc 11 at a constant (i.e., to keep the rotational speed of disc 11 at the prescribed linear velocity).

In the usual reproducing state as described above, an address reproduced in modulator/error corrector 18 is supplied to address regenerator 23 so as to reproduce an address data showing the present track of the optical pickup and to output it to controller 24. Controller 24 has therein, for example, a microprocessor (not shown in FIGURE) for controlling the fast feeding operation of optical pickup 13 when the fast search operation is required. In other words, when the fast search operation is requested, controller 24 calculates the direction for the movement of optical pickup 13 and the moving distance based on the address data that shows the present track of the optical pickup 13, which has been supplied by address regenerator 23, and the address data for the target track for optical pickup 13, which is input from outside with the required operation of the fast search operation, and generates the track jump signal representing the calculated result.

Then, the track jump signal output from the controller is supplied to driving signal generator 25 so as to be converted into a motor driving signal for driving the pickup feed motor (not shown) so as to move optical pickup 13 in the radial direction of disc 11. Accordingly optical pickup 13 moves in the intended direction from the present track and stops at the target track.

In sum, the rotational speed of disc drive motor 12 is controlled to meet the frequency of the linear velocity signal output from linear velocity signal generator 17 with that of the frequency of the reference signal generated by reference signal generator 21, so as to realize the reproducing of the data from the disc 11 in the target track.

The digital data read by optical pickup 13 is operated on by various data processing in data extractor 16 and demodulator/error corrector 18 and is output from output terminal 19 as a proper digital data. Further, data extractor 16 and demodulator/error corrector 18 operates a data processing operation based on the bit synchronizing clock signal output form PLL circuit 15.

If PLL circuit 15 can generate a bit synchronizing clock signal from the digital data read by optical pickup 13, which is synchronized to the phase of the digital data, it will be possible to reproduce data from disc 11 even if the relative velocity between optical pickup 13 and disc 11 is not completely adjusted after optical pickup 13 reaches the target track by the fast search operation (i.e., the rotational speed control of the disc is not brought to full completion).

In short, if the capture range that is used for phase-locking into the frequency range of the input digital data is defined widely it will be possible to reproduce data from disc 11 before the rotational speed control of disc 11 has been brought to full completion. In other words, before the relative velocity between optical pickup 13 and disc 11 can be adjusted after optical pickup 13 reaches the target track by the fast search operation.

The CD-ROM drive system's bit synchronizing clock frequency is 4.3218 MHz. Based on the following representations:

$$(500 \text{ rpm}/200 \text{ rpm}) \times 4.3218 \text{ MHz} = 10.8045 \text{ MHz};$$

and $$(200 \text{ rpm}/500 \text{ rpm}) \times 4.3218 \text{ MHz} = 1.72872 \text{ MHz}$$

the capture range of PLL circuit 15 would be defined, at most, to keep a range from 1.72827 MHz to 10.8045 MHz.

When the bit synchronizing clock frequency output from PLL circuit 15 is 4.3218 MHz, optical pickup 13 is at the inner most radius track of disc 11 (i.e., 0 minutes and 2.00 second block by address). And, when optical pickup 13 moves to the outer most radius track of disc 11 (i.e., 60 minutes and 0.00 second block by address), the frequency of the bit synchronizing clock signal output by PLL circuit 15 needs to become 10.8045 MHz. In contrast, when the bit synchronizing clock signal output by PLL circuit 15 is 4.3218 MHz and optical pickup 13 is at the outer most radius track of disc 11 (i.e., 60 minuets and 0.00 second block by address) and optical pickup 13 moves to the inner most radius track of disc 11 (i.e., 0 minutes and 2.00 second block by address), the bit synchronizing clock frequency output by PLL circuit 15 needs to become 1.72872 MHz.

Thus, even if it takes no time to move the optical pickup to the target track, it is possible for PLL circuit 15 to generate the bit synchronizing clock signal by phase-locking it with the digital data obtained from optical pickup 13 at the same time that optical pickup 13 is stopped after reaching the target track, then it becomes possible to perform the data processing operation in data extractor 16 and demodulator/error corrector 18.

But in reality, it never takes 0 seconds to move optical pickup 13 at high speed from the present track to the target track, instead, it always takes a finite time Tj. Because the controlling of the rotational speed of disc 11 is performed during the time Tj, the capture range of PLL circuit 15 is actually defined to be narrower than between 1.72872 MHz to 10.8045 MHz. In other word, the capture range of PLL circuit 15 has only to be defined to phase-lock it with the digital data obtained from optical pickup 13, which reaches the target track by the fast search operation. To be more specific, the capture range of PLL circuit 15 is compensated for the difference between the time Tj and a rotating controlling time Tn, which runs from the start of the fast search operation and ends at the completion of the rotation speed control for disc 11. Therefore, if the capture range Cp of PLL circuit 15 is set as described above it is made possible to reproduce data from disc 11 just after optical pickup 13 reaches the target track, and thus sharply reduces the time between the arrival of optical pickup 13 at the target track and the reproducing of the digital data. Accordingly it is possible to achieve a fast search operation without waiting a long time, which is conventionally involved in the completion of the rotation speed control for disc 11.

When the time Tn has elapsed, the bit synchronizing clock frequency output from PLL circuit 15 will reach 4.3218 MHz and become stable. Since the capture range Cp (%) of the rotating controlling time Tn, the fast moving time Tj and PLL circuit 15 is generally defined as:

$$|(Tn-Tj)/Tn| < Cp/100,$$

it is possible to obtain the effect described above.

Further, since a transmission rate of the digital data is fixed after the completion of the CLV servo adjustments, the present invention is particularly effective for reproducing digital data associated with moving picture. PLL circuit 15, as described above, is effective for use in a system that performs analog processing of the data as well as digital processing of the data. The system operates better with analog processing because it is possible to define a wider capture range without having the high speed operating clock signal.

Figure 3:
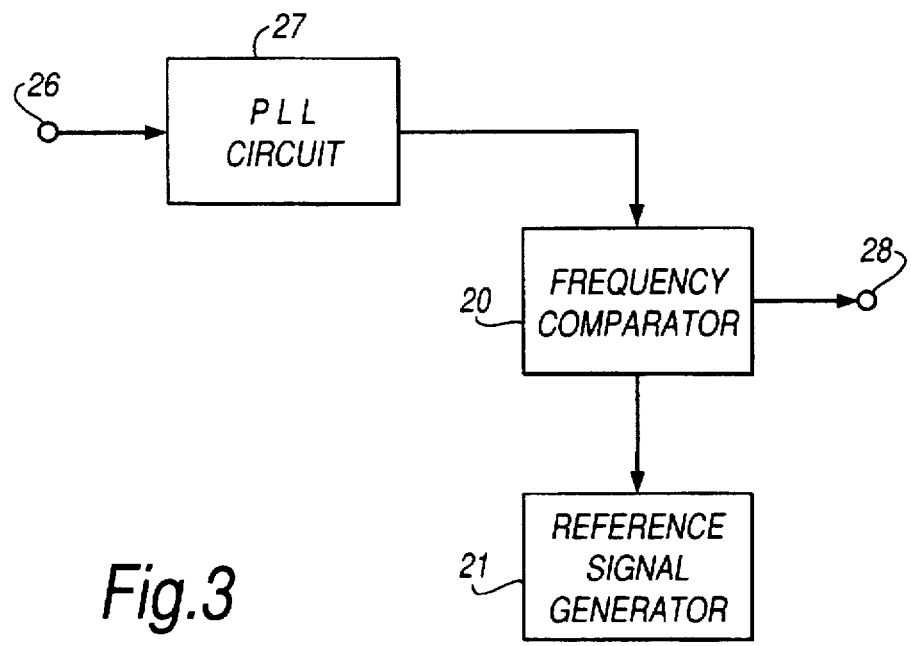
FIG. 3 is a block construction diagram showing a linear velocity signal generator.

FIG. 3 shows linear velocity signal generator 17 for obtaining the linear velocity signal having a frequency that is related to the rotation speed of disc 11. That is, a digital data read by optical pickup 13 is supplied to input terminal 26 via PLL circuit 27. PLL circuit 27 generates a clock signal that is synchronous with the phase of the input digital data (i.e., the clock signal having a frequency that is related to the rotational speed of disc 11) and outputs the clock signal to frequency comparator 20.

Frequency comparator 20 compares the frequency of the clock signal output from PLL circuit 27 and the fixed frequency of reference signal output from reference signal generator 21 and supplies a torque control signal associated with the frequency difference between the linear velocity signal and the reference signal to power amplifier 22 through output terminal 28 so as to drive disc drive motor 12 and further control the rotational speed of disc 11 to a uniform linear velocity.

Figure 4:
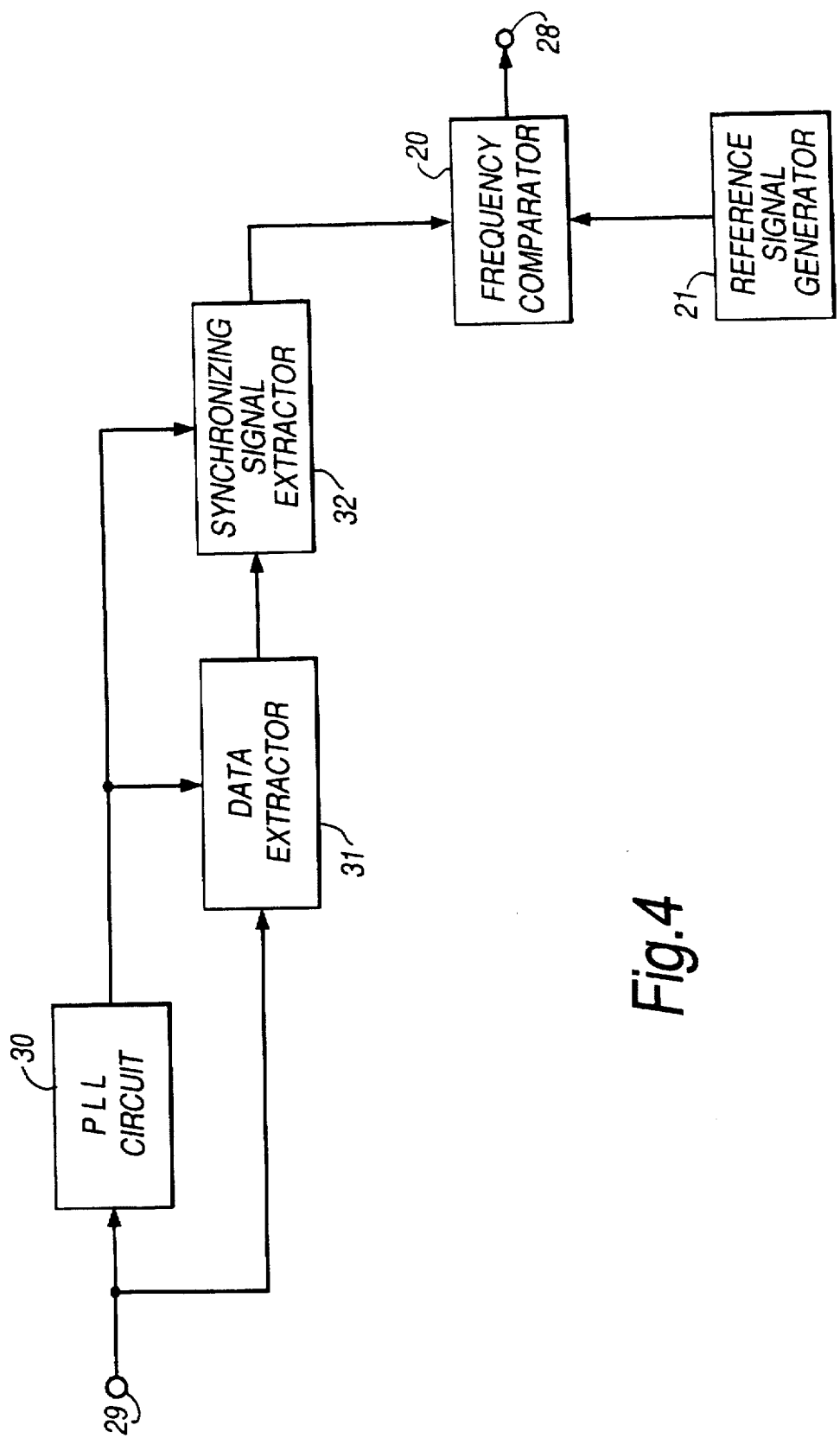
FIG. 4 is a block construction diagram showing another example of a linear velocity signal generator.
Figure 5:
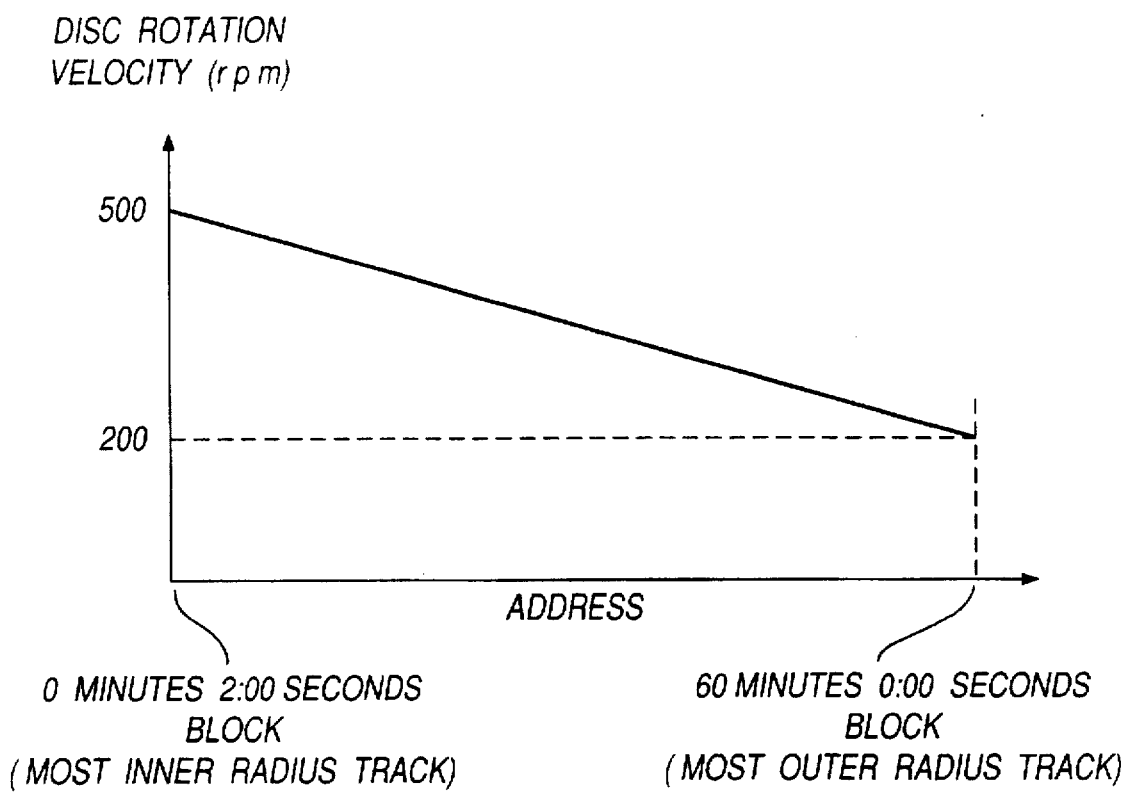
FIG. 5 is a characteristic diagram showing a relation between the track of the optical pickup and the rotation speed of the disc.

FIG. 4 shows another example of linear velocity signal generator 17. That is, the digital data read by optical pickup 13 is supplied to PLL circuit 30 and data extractor 31 via input terminal 29. PLL circuit 30 generates a clock signal that is synchronized with the phase of the input digital data and outputs the clock signal to data extractor 31 and synchronizing signal detector 32.

Data extractor 31 extracts data from the input digital data based on the clock signal output from PLL circuit 30 and outputs the data to synchronizing signal extractor 32.

And, synchronizing signal extractor 32 extracts a synchronizing signal having a frequency that is related to the rotational speed of the disc from the input digital data based on the clock signal output from PLL circuit 30 and outputs the synchronizing signal to frequency comparator 20. Thus, frequency comparator 20 compares the frequency of synchronizing signal output from synchronizing signal extractor 32 and the fixed frequency of the reference signal output from reference signal generator 21, and supplies a torque control signal associated with the frequency difference between the linear velocity signal and the reference signal to power amplifier 22 through output terminal 28 so as to drive disc drive motor 12 and further control the rotational speed of disc 11 to the uniform linear velocity.

The present invention is not limited to the above embodiment and can be operated by modifying it in various forms without departing from the principle of the present invention. As described above, the present invention can provide the track jump servo apparatus for the disc reproducing system that is able to reduce the time between the acquisition of the target track to the completion of reading the data without using a disc drive motor that has a large torque and is also be able to realize a fast search operation.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefor, it is intended that the present invention not be limited to the particular embodiment disclosed as the best mode contemplated for carrying out the present invention, but that the present invention includes all embodiments falling within the scope of the appended claims.

The foregoing description and the drawings are regarded by the applicant as including a variety of individually inventive concepts, some of which may lie partially or wholly outside the scope of some or all of the following claims. The fact that the applicant has chosen at the time of filing of the present application to restrict the claimed scope of protection in accordance with the following claims is not to be taken as a disclaimer or alternative inventive concepts that are included in the contents of the application and could be defined by claims differing in scope from the following claims, which different claims may be adopted subsequently during prosecution, for example, for the purposes of a divisional application.

What is claimed is:

1. A track jump servo apparatus for a disc reproducing system, comprising:

a pickup constructed and arranged to read data recorded on a disc that is rotated by a disc drive motor;

phase-lock loop means for generating a clock signal that is phase-locked with the data read by the pickup;

means for extracting and demodulating, based on the clock signal generated by the phase-lock loop means, the data read by the pickup;

means for generating a linear velocity signal that includes a frequency that is related to the rotational speed of the disc;

servo means for controlling, based on the linear velocity signal, the rotational speed of the disc drive motor so as to keep a constant relative speed between the pickup and the disc; and pickup feed means for performing, based on the extracted and demodulated data, a pickup feed operation whereby the pickup is moved in the radial direction of the disc; and wherein, as a result of the phase-locking of the clock signal with the data read by the pickup, a capture range of the phase-lock loop means is controlled so as to enable the extraction and demodulation of the data read by the pickup at a completion of the pickup feed operation and before the servo means causes the relative speed of the disc drive motor to obtain the constant relative speed between the pickup and the disc.

2. A track jump servo apparatus for a disc reproducing system as recited in claim 1, wherein the phase-lock loop means performs analog processing on the data so as to generate the clock signal that is phase-locked with the data.

3. A track jump servo apparatus for a disc reproducing system as recited in claim 2, wherein the linear velocity signal generating means includes a second phase-locked loop means for generating, based on the data read by the pickup, a second clock signal that has a frequency that is related to the rotational speed of the disc.

4. A track jump servo apparatus for a disc reproducing system as recited in claim 3, wherein the linear velocity signal generating means further includes synchronizing signal extracting means for extracting a synchronizing signal that has a frequency that is related to the rotational speed of the disc, which is obtained from the data read by the pickup.

5. A track jump servo apparatus for a disc reproducing system as recited in claim 3, wherein the servo means includes:

frequency comparing means for comparing the frequency of the linear velocity signal generated by the linear velocity signal generating means with a frequency of a reference signal; and driving signal generating means for generating, based on a result of the comparison made by the frequency comparing means, a driving signal for driving the disc drive motor.

6. A track jump servo apparatus for a disc reproducing system as recited in claim 1, wherein the linear velocity signal generating means includes a second phase-locked loop means for generating, based on the data read by the pickup, a second clock signal that has a frequency that is related to the rotational speed of the disc.

7. A track jump servo apparatus for a disc reproducing system as recited in claim 6, wherein the linear velocity signal generating means further includes synchronizing signal extracting means for extracting a synchronizing signal that has a frequency that is related to the rotational speed of the disc, which is obtained from the data read by the pickup.

8. A track jump servo apparatus for a disc reproducing system as recited in claim 6, wherein the servo means includes:

frequency comparing means for comparing the frequency of the linear velocity signal generated by the linear velocity signal generating means with a frequency of a reference signal; and driving signal generating means for generating, based on a result of the comparison made by the frequency comparing means, a driving signal for driving the disc drive motor.

9. A track jump servo apparatus for a disc reproducing system as recited in claim 1, wherein the linear velocity signal generating means further includes synchronizing signal extracting means for extracting a synchronizing signal that has a frequency that is related to the rotational speed of the disc, which is obtained from the data read by the pickup.

10. A track jump servo apparatus for a disc reproducing system as recited in claim 1, wherein the servo means includes:

frequency comparing means for comparing the frequency of the linear velocity signal generated by the linear velocity signal generating means with a frequency of a reference signal; and driving signal generating means for generating, based on a result of the comparison made by the frequency comparing means, a driving signal for driving the disc drive motor.

11. A track jump servo apparatus for a disc reproducing system comprising:

a pickup constructed and arranged to read data recorded on a disc that is rotated by a disc drive motor;

phase-lock loop means for generating a clock signal that is phase-locked with the data read by the pickup;

means for processing, based on the clock signal generated by the phase-lock loop means, the data read by the pickup;

means for generating a linear velocity signal that includes a frequency that that is related tot he rotational speed of the disc;

servo means for controlling, based on the linear velocity signal, the rotational speed of the disc drive motor so as to keep a constant relative speed between the pickup and the disc; and pickup feed means for performing, based on the processed data, a pickup feed operation whereby the pickup is moved in the radial direction of the disc;

wherein, as a result of the phase-locking of the clock signal with the data read by the pickup, a capture range of the phase-lock loop means is controlled so as to enable the processing of the data read by the pickup at a completion of the pickup feed operation; and wherein a time Tj is a time required for completing the pickup feed operation, a time Tn is a time required for the servo means to obtain the constant relative speed between the pickup and the disc at a target track, and the capture range (Cp) of the phase-lock loop means is defined by:

$$[(Tn-Tj)/Tn]<Cp/100.$$

12. A track jump servo apparatus for a disc reproducing system as recited in claim 11, wherein the phase-lock loop means performs analog processing on the data so as to generate the clock signal that is phase-locked with the data.

13. A track jump servo apparatus for a disc reproducing system as recited in claim 12, wherein the linear velocity signal generating means includes a second phase-locked loop means for generating, based on the data read by the pickup, a second clock signal that has a frequency that represents the rotational speed of the disc.

14. A track jump servo apparatus for a disc reproducing system as recited in claim 13, wherein the linear velocity signal generating means further includes synchronizing signal extracting means for extracting a synchronizing signal that has a frequency that is related to the rotational speed of the disc, which is obtained from the data read by the pickup.

15. A track jump servo apparatus for a disc reproducing system as recited in claim 13, wherein the servo means includes:
   frequency comparing means for comparing the frequency of the linear velocity signal generated by the linear velocity signal generating means with a frequency of a reference signal; and
   driving signal generating means for generating, based on a result of the comparison made by the frequency comparing means, a driving signal for driving the disc drive motor.

16. A track jump servo apparatus for a disc reproducing system as recited in claim 12, wherein the linear velocity signal generating means further includes synchronizing signal extracting means for extracting a synchronizing signal that has a frequency that is related to the rotational speed of the disc, which is obtained from the data read by the pickup.

17. A track jump servo apparatus for a disc reproducing system as recited in claim 12, wherein the servo means includes:
   frequency comparing means for comparing the frequency of the linear velocity signal generated by the linear velocity signal generating means with a frequency of a reference signal; and
   driving signal generating means for generating, based on a result of the comparison made by the frequency comparing means, a driving signal for driving the disc drive motor.

18. A track jump servo apparatus for a disc reproducing system as recited in claim 11, wherein the linear velocity signal generating means includes a second phase-locked loop means for generating, based on the data read by the pickup, a second clock signal that has a frequency that is related to the rotational speed of the disc.

19. A track jump servo apparatus for a disc reproducing system as recited in claim 18, wherein the linear velocity signal generating means further includes synchronizing signal extracting means for extracting a synchronizing signal that has a frequency that is related to the rotational speed of the disc, which is obtained from the data read by the pickup.

20. A track jump servo apparatus for a disc reproducing system as recited in claim 11, wherein the servo means includes:
   frequency comparing means for comparing the frequency of the linear velocity signal generated by the linear velocity signal generating means with a frequency of a reference signal; and
   driving signal generating means for generating, based on a result of the comparison made by the frequency comparing means, a driving signal for driving the disc drive motor.

21. A track jump servo apparatus for a disc reproducing system as recited in claim 11, wherein the linear velocity signal generating means further includes synchronizing signal extracting means for extracting a synchronizing signal that has a frequency that is related to the rotational speed of the disc, which is obtained from the data read by the pickup.

22. A track jump servo apparatus for a disc reproducing system as recited in claim 11, wherein the servo means includes:
   frequency comparing means for comparing the frequency of the linear velocity signal generated by the linear velocity signal generating means with a frequency of a reference signal; and
   driving signal generating means for generating, based on a result of the comparison made by the frequency comparing means, a driving signal for driving the disc drive motor.

23. A track jump servo apparatus for a disc reproducing system, comprising:
   a pickup constructed and arranged to read data recorded on a disc that is rotated by a disc drive motor;
   a phase-lock loop circuit constructed and arranged to generate a clock signal that is phase-locked with the data read by the pickup;
   a data processing circuit constructed and arranged to extract and demodulate, based on the clock signal generated by the phase-lock loop circuit, the data read by the pickup;
   a linear velocity signal generator constructed and arranged to generate a linear velocity signal that includes a frequency that is related to the rotational speed of the disc;
   a controller constructed and arranged to control, based on the linear velocity signal, the rotational speed of the disc drive motor so as to keep a constant relative speed between the pickup and the disc; and
   pickup feed motor constructed and arranged to perform, based on the extracted and demodulated data, a pickup feed operation whereby the pickup is moved in the radial direction of the disc; and
   wherein, as a result of the phase-locking of the clock signal with the data read by the pickup, a capture range of the phase-lock loop circuit is controlled so as to enable the processing of the data read by the pickup at a completion of the pickup feed operation and before the servo means causes the relative speed of the disc drive motor to obtain the constant relative speed between the pickup and the disc.

24. A track jump servo apparatus for a disc reproducing system as recited in claim 23, wherein the phase-lock loop circuit performs analog processing on the data so as to generate the clock signal that is phase-locked with the data.

25. A track jump servo apparatus for a disc reproducing system as recited in claim 24, wherein the linear velocity signal generator includes a second phase-locked loop circuit constructed and arranged to generate, based on the data read by the pickup, a second clock signal that has a frequency that is related to the rotational speed of the disc.

26. A track jump servo apparatus for a disc reproducing system as recited in claim 25, wherein the linear velocity signal generator further includes synchronizing signal extractor that is constructed and arranged to extract a synchronizing signal that has a frequency that is related to the rotational speed of the disc, which is obtained from the data read by the pickup.

27. A track jump servo apparatus for a disc reproducing system as recited in claim 25, wherein the controller includes:

a frequency comparator constructed and arranged to compare the frequency of the linear velocity signal generated by the linear velocity signal generator with a frequency of a reference signal; and driving signal generator constructed and arranged to generate, based on a result of the comparison made by the frequency comparator, a driving signal for driving the disc drive motor.

28. A track jump servo apparatus for a disc reproducing system, comprising:

a pickup constructed and arranged to read data recorded on a disc that is rotated by a disc drive motor;

a phase-lock loop circuit constructed and arranged to generate a clock signal that is phase-locked with the data read by the pickup;

a data processing circuit constructed and arranged to extract and demodulate, based on the clock signal generated by the phase-lock loop circuit, the data read by the pickup;

a linear velocity signal generator constructed and arranged to generate a linear velocity signal that includes a frequency that is related to the rotational speed of the disc;

a controller constructed and arranged to control, based on the linear velocity signal, the rotational speed of the disc drive motor so as to keep a constant relative speed between the pickup and the disc; and pickup feed motor constructed and arranged to perform, based on the extracted and demodulated data, a pickup feed operation whereby the pickup is moved in the radial direction of the disc;

wherein, as a result of the phase-locking of the clock signal with the data read by the pickup, a capture range of the phase-lock loop circuit is controlled so as to enable the processing of the data read by the pickup at a completion of the pickup feed operation; and wherein a time Tj is a time required for completing the pickup feed operation, a time Tn is a time required for the controller to obtain the constant relative speed between the pickup and the disc at a target track, and the capture range (Cp) of the phase-lock loop circuit is defined by:

$$|(Tn-Tj)/Tn|<Cp/100.$$

29. A track jump servo apparatus for a disc reproducing system as recited in claim 28, wherein the phase-lock loop circuit performs analog processing on the data so as to generate the clock signal that is phase-locked with the data.

30. A track jump servo apparatus for a disc reproducing system as recited in claim 29, wherein the linear velocity signal generator includes a second phase-locked loop circuit constructed and arranged to generate, based on the data read by the pickup, a second clock signal that has a frequency that is related to the rotational speed of the disc.

31. A track jump servo apparatus for a disc reproducing system as recited in claim 30, wherein the linear velocity signal generator further includes synchronizing signal extractor that is constructed and arranged to extract a synchronizing signal that has a frequency that is related to the rotational speed of the disc, which is obtained from the data read by the pickup.

32. A track jump servo apparatus for a disc reproducing system as recited in claim 30, wherein the controller includes:

a frequency comparator constructed and arranged to compare the frequency of the linear velocity signal generated by the linear velocity signal generator with a frequency of a reference signal; and driving signal generator constructed and arranged to generate, based on a result of the comparison made by the frequency comparator, a driving signal for driving the disc drive motor.

* * * * *

UNITED STATES PATENT AND TRADEMARK OFFICE
CERTIFICATE OF CORRECTION

PATENT NO. : 5,761,163
DATED : June 2, 1998
INVENTOR(S) : NAKANE et al.

It is certified that error appears in the above-identified patent and that said Letters Patent is hereby corrected as shown below:

On the title page,

Please add: --[30] Foreign Application Priority Data

Sep 26, 1994 [JP] Japan P06-229364--

Signed and Sealed this

Third Day of October, 2000

Attest:

Q. TODD DICKINSON

*Attesting Officer*      *Director of Patents and Trademarks*